United States Patent [19]
Pfeiffer et al.

[11] 4,306,735
[45] Dec. 22, 1981

[54] SAFETY BELT CLAMP APPARATUS, OCCUPANT RESTRAINT SYSTEM AND METHOD

[75] Inventors: Robert C. Pfeiffer, Macon, Ga.; Robert L. Stephenson, Sterling Heights, Mich.; Per O. Weman, Heverlee, Belgium

[73] Assignee: Allied Chemical Corporation, Morris Township, Morris County, N.J.

[21] Appl. No.: 10,455

[22] Filed: Feb. 8, 1979

Related U.S. Application Data

[63] Continuation of Ser. No. 746,030, Nov. 30, 1976.

[51] Int. Cl.³ .......................................... B60R 21/10
[52] U.S. Cl. ................................. 280/807; 280/733; 280/806; 280/808
[58] Field of Search ............... 280/807, 808, 801, 805, 280/806; 297/476, 479; 242/107.7, 107.4 R, 107.4 D, 107.2, 107.3, 84.52 A

[56] References Cited

U.S. PATENT DOCUMENTS

| | | | |
|---|---|---|---|
| 2,705,529 | 4/1955 | Bull | 280/808 |
| 3,003,589 | 10/1961 | Desbrow | 188/72.9 X |
| 3,205,004 | 9/1965 | Spouge | 242/107.2 |
| 3,323,831 | 6/1967 | Buechler | 297/476 |
| 3,389,874 | 6/1968 | Van Noord | 242/107.2 |
| 3,467,337 | 9/1969 | Putman | 242/107.2 |
| 3,592,507 | 7/1971 | Gionet | 297/479 |
| 3,692,253 | 9/1972 | Curran | 242/107.4 R |
| 3,817,473 | 6/1974 | Board | 242/107.2 |
| 3,817,474 | 6/1974 | Board | 242/107.2 |
| 3,847,434 | 11/1974 | Weman | 242/107.2 |
| 3,885,812 | 5/1975 | Lauenne | 280/806 |
| 3,886,374 | 5/1975 | Lefeuvre | 180/268 |
| 3,911,535 | 10/1975 | Mauron | 242/107.2 |
| 3,924,875 | 12/1975 | Lefeuvre | 280/807 |
| 3,929,348 | 12/1975 | Lawwill | 280/805 |
| 3,930,682 | 1/1976 | Booth | 242/107.2 |
| 4,009,510 | 3/1977 | Lindblad | 297/479 |
| 4,120,466 | 10/1978 | Adomeit | 242/107.2 |

FOREIGN PATENT DOCUMENTS 2414952 10/1975 Fed. Rep. of Germany .
305138 10/1968 Sweden .

Primary Examiner—John P. Silverstrim
Attorney, Agent, or Firm—Roger H. Criss

[57] ABSTRACT

An improved belt clamp apparatus for a vehicle occupant safety restraint system includes: a lever, a clamp bar, a mounting device for movably mounting the bar on the lever, a crest on the bar, and a first spring for biasing the lever to a non-clamping position. The bar is movable on the crest for applying a substantially uniform force over an area of contact on a safety belt. The belt clamp apparatus may be used in a variety of ways in an improved occupant restraint system such as to provide: a belt sensitive restraint system, a vehicle sensitive restraint system, a dual sensitive restraint system, or a force limiting restraint system. The invention also relates to a method for absorbing unwinding force and a method for reducing undesired unwinding of the belt.

33 Claims, 10 Drawing Figures

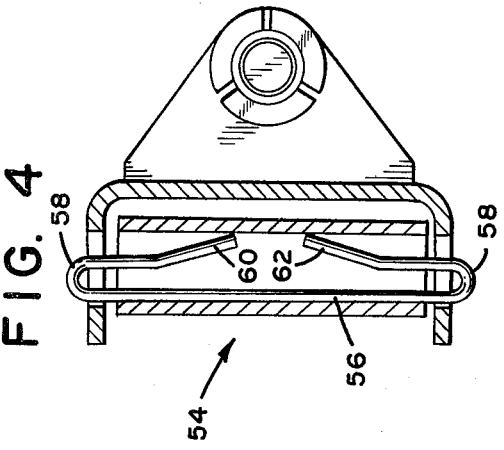
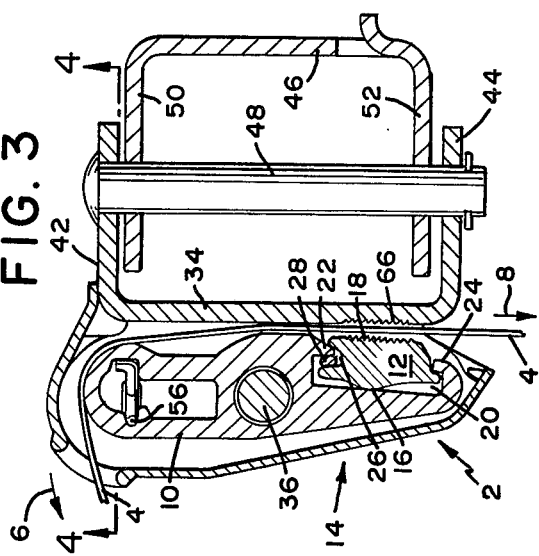
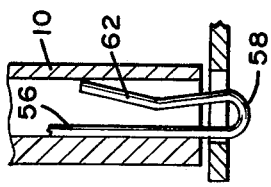
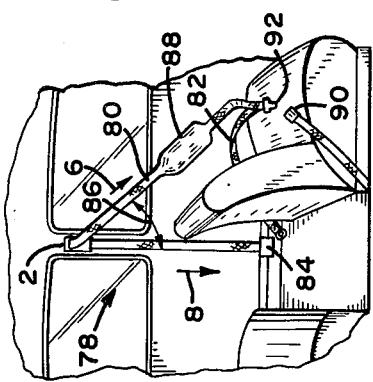
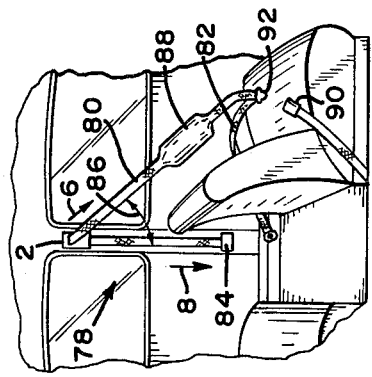
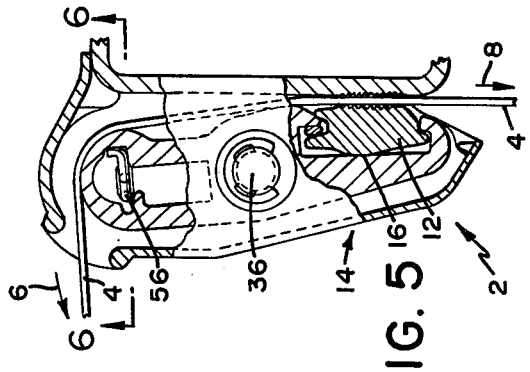
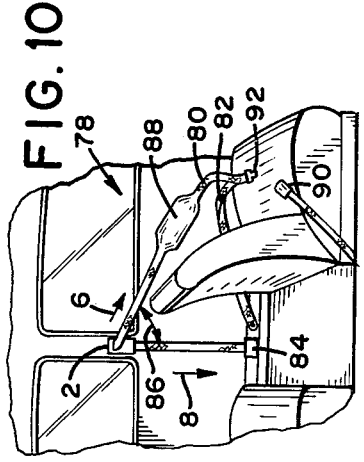

SAFETY BELT CLAMP APPARATUS, OCCUPANT RESTRAINT SYSTEM AND METHOD

This is a continuation of application Ser. No. 746,030, filed Nov. 30, 1976.

BACKGROUND OF THE INVENTION

The present invention relates to an improved belt clamp apparatus and to an improved vehicle occupant restraint system having a safety belt which is movable through the clamp apparatus. The belt clamp apparatus applies a substantially uniform force over an area of contact on the belt.

The belt clamp apparatus is an improvement of a belt clamp apparatus described in U.S. Pat. No. 3,847,434 issued Nov. 12, 1974 to Per Olof Weman.

A first and primary object of the present invention is to reduce forward displacement of an occupant, either passenger or driver, in a vehicle, such as an automobile or truck. A second object is to provide a restraint system which may use a simpler, inexpensive retractor. A third object is to provide a reusable restraint system which can absorb some of the force applied on a safety belt and thereby reduce the force felt by the occupant.

DESCRIPTION OF THE DRAWINGS

FIGS. 1 and 3 are vertical sections of a belt clamp apparatus.

FIG. 4 is a horizontal section along the lines 4—4 in FIG. 3.

FIG. 5 is a side view of the belt clamp apparatus shown in FIG. 3.

FIG. 6 is a partial horizontal section along the lines 6—6 in FIG. 5.

FIGS. 8, 9 and 10 are perspective views of an improved occupant restraint system in a vehicle using the improved belt clamp apparatus of FIGS. 1-7.

SUMMARY OF THE INVENTION

Figure 1:
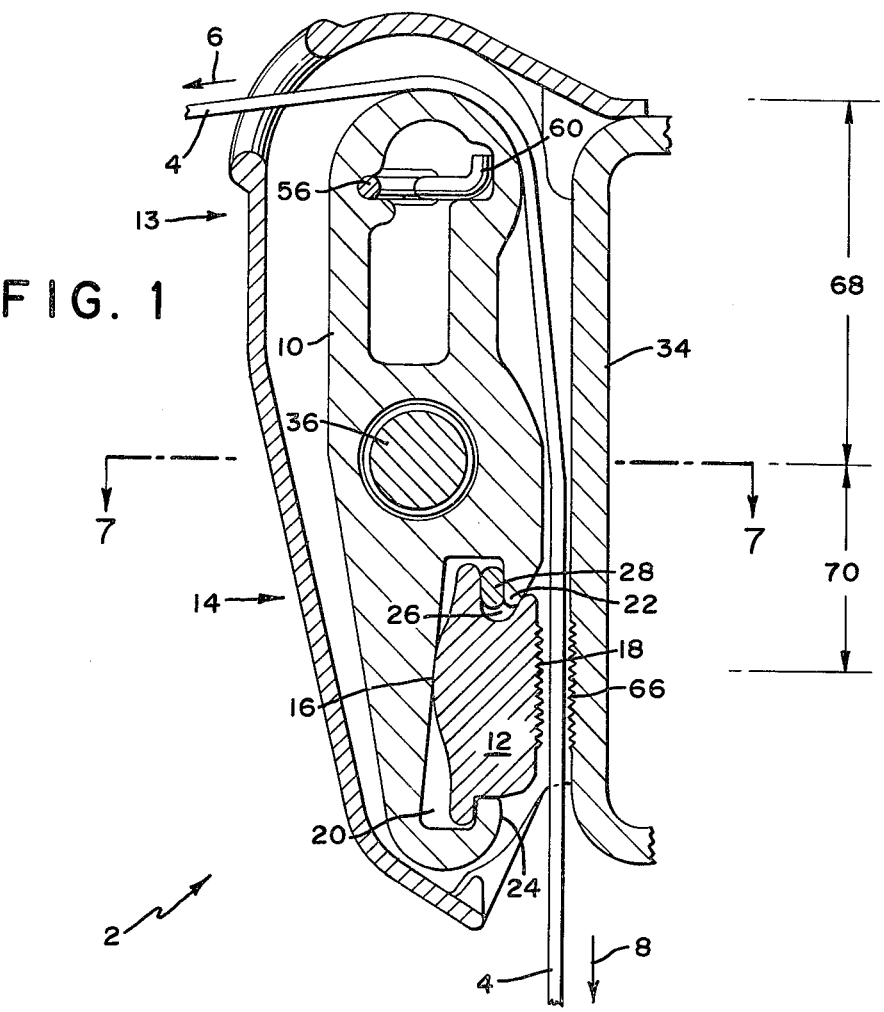

In a belt clamp apparatus of the present invention, a safety belt is movable through the apparatus in a first direction and in an opposite second direction. The clamp apparatus stops movement of the belt in the first direction when a force above a predetermined amount is applied to the belt in the first direction. The clamp apparatus includes a lever pivotable on a first shaft and having a clamping position and a non-clamping position.

The improvement of the present invention includes: a clamp means, a mounting means on the lever, a first biasing means biasing said lever to its non-clamping position and a crest on the clamp means. The clamp means has a first surface for contacting a portion of the belt. The mounting means on the lever movably mounts the clamp means on the lever. The clamp means is movable on the crest with respect to the lever for applying a substantially uniform force across an area of contact on the belt. The clamp apparatus may further include a pivot means for moving a portion of the apparatus in a substantially vertical plane and a swivel means for moving a portion of the apparatus in a substantially horizontal plane. The clamp apparatus may further include resilient bushing means within the lever for evenly distributing force applied by the lever laterally across the width of the belt.

The belt clamp apparatus of the present invention may be used in a variety of ways in an improved safety restraint system for a vehicle, such as to provide: a belt sensitive safety restraint system, a vehicle sensitive safety restraint system, a dual sensitive safety restraint system, or a force limiting safety restraint system. If a belt sensitive safety restraint system is desired, the retractor may be a non-locking retractor and the belt clamp apparatus provides the system with belt sensitive capability. In response to a force above a first predetermined amount, the belt clamp apparatus clamps against the safety belt, stopping further movement of the belt through the belt clamp apparatus in the first direction.

If a vehicle sensitive safety restraint system is desired, the belt clamp apparatus may be used in combination with a vehicle sensitive retractor. The belt clamp apparatus is arranged so that a comparatively high amount of force is required to move the belt clamp apparatus into its clamping position. As a result, the vehicle sensitive retractor comes into play before the belt clamp apparatus. If a dual sensitive safety restraint system is desried, the belt clamp apparatus may be used in combination with a vehicle sensitive retractor. The belt clamp apparatus 2 provides the restraint system with its belt sensitive capability. The vehicle sensitive retractor provides the safety restraint system with its vehicle capability.

If a force limiting safety restraint system is desired, the safety belt apparatus may be used in conjunction with a belt sensitive retractor. When a force above a first predetermined amount is exerted on the belt, the belt clamp apparatus clamps against the belt and prevents further movement of the belt through the clamp apparatus until the force on the belt reaches a second predetermined amount, which is greater than the first predetermined value. The belt clamp apparatus has means responsive to the force on the belt above the second predetermined amount to allow controlled slippage of the belt through the belt clamp apparatus, thereby absorbing some of all of the force above the second predetermined amount. If the force on the belt reaches a third predetermined amount which is in excess of the second predetermined amount, the belt sensitive locking mechanism in the retractor comes into play. The belt sensitive mechanism in the retractor locks in response to the force above the third predetermined amount, thereby preventing further unwinding of the belt from the retractor. The retractor in the force limiting system may be dual sensitive.

Controlled slippage of the web through the belt clamp apparatus may be achieved by: changes in design within the belt clamp apparatus, such as by varying the leverage of the lever; by varying the frictional force of the clamping portion; or a change in the included angle of the belt passing through the clamp apparatus; or changes in the surface characteristicracteristics of the belt.

The safety belt may further include an inflatable portion and means for inflating it. The invention also includes: a method for absorbing unwinding force resulting from a pull on the safety belt when an occupant lurches forward against the belt; and a method for reducing undesired unwinding of the belt from a retractor in a safety restraint system after a locking action has been applied to the belt within the retractor and reducing undesired elongation of the belt between the retractor and the occupant.

DETAILED DESCRIPTION

Referring to FIG. 1, the belt clamp apparatus, referred to generally by the numeral 2, may be used with a vehicle occupant restraint system having a shoulder belt 4. For example, the belt clamp apparatus 2 may be used as a substitute for a bracket means in a restraint system described in U.S. Pat. No. 3,847,434. The belt 4 is movable throughout the belt clamp apparatus 2 in a first unwinding direction 6 in which the belt 4 becomes more loose around the occupant and in an opposite second winding direction 8 in which the belt 4 becomes tighter around the occupant. The belt clamp apparatus 2 includes a lever 10 pivotable on a first shaft 36. The belt clamp apparatus 2 resists movement of the belt 4 in the first unwinding direction 6 when a force above a predetermined amount is applied to the belt 4 in the unwinding direction 6. The lever 10 has a clamping position shown in FIG. 5 and a non-clamping position, shown in FIGS. 1 and 3.

The improvement of the present invention includes a clamp means such as a clamp bar 12, a mounting means, referred to generally by the numeral 14, for the clamp bar 12 adjacent to a lower end of the lever 10, a longitudinal crest 16 along the longitudinal axis of the clamp bar 12 and a first biasing means 13 for biasing said lever in its non-clamping position. The clamp bar 12 has a first surface 18 for contacting a portion of the belt 4. The mounting means 14 may be a channel 20 in the lever 10. The clamp bar 12 is disposed in the channel 20 and is movable with reference to the lever 10. The lever 10 also includes retaining means for retaining the bar 12 in the channel 20. The crest 16 is disposed on a second surface of the bar 12 opposite from the first surface 18 which contacts a portion of the belt 4. The bar 12 is movable on the crest 16 in the channel 20 for applying a substantially uniform force over an area of contact on the belt 4.

The retaining means for retaining the bar 12 in the channel 20 includes: a first lip 22 on a first side of the channel 20 and a second lip 24 on a second opposing side of the channel 20. The clamp apparatus 2 further includes a recess 26 in the bar 12 adjacent to the first lip 22 and a second biasing means, which may be a spring 28, disposed in the recess 26 between the bar 12 and the first lip 22 of the lever 10. The spring 28 biases the bar 12 away from the portion of the belt 4 adjacent to the first surface 18, and prevents the surface 18 from interfering with free movement of the belt 4 when the lever is in its non-clamping position shown in FIGS. 1 and 3. The spring 28 also prevents rattle of the bar 12 within the recess 20.

Figure 2:
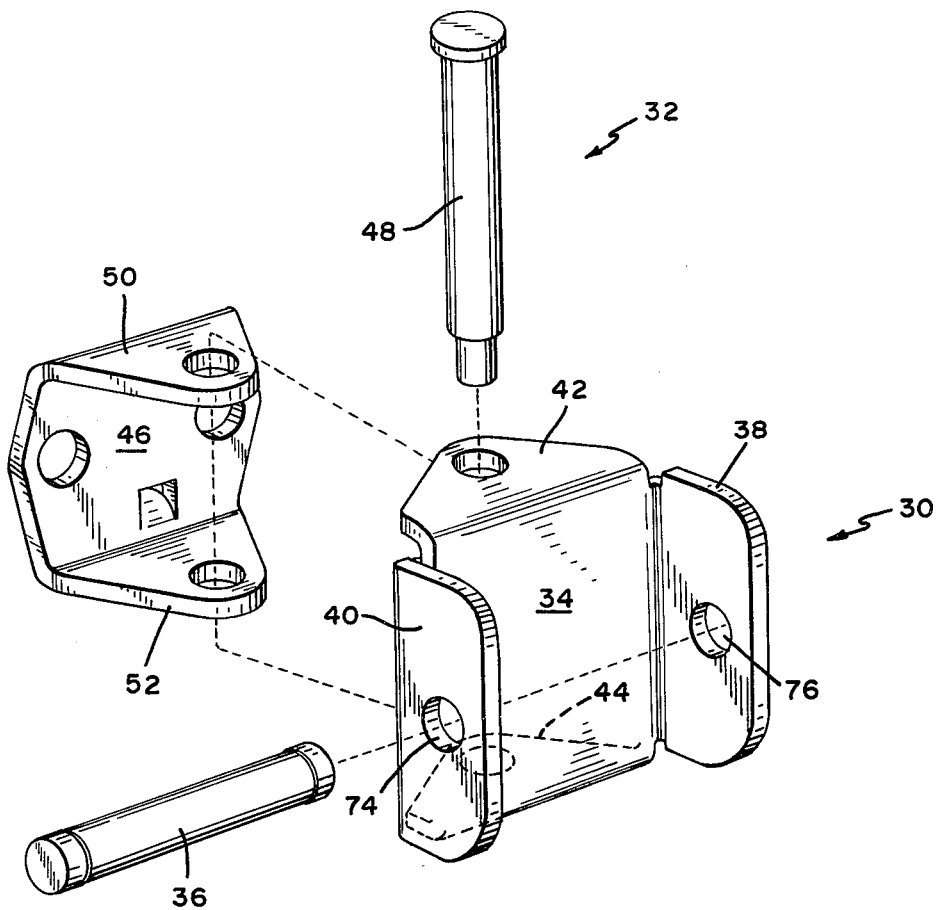
FIG. 2 is a perspective view of a portion of the apparatus of FIGS. 1 and 3.

Referring to FIGS. 1 and 2, the clamp apparatus 2 further includes a pivot means, referred to generally by the numeral 30, for moving the lever 10 and its associated components in a substantially vertical plane and a swivel means, referred to generally by the numeral 32, for moving the lever 10 and its associated components in a substantially horizontal plane. The pivot means 30 includes a first side 38 and a second side 40 disposed parallel to one another in a substantially vertical plane. The first and second sides 38 and 40 form upstanding legs of a U shape. The lever 10 is disposed between the first side 38 and the second side 40 of the first bracket 34. The first shaft 36 is disposed in a substantially horizontal plane and passes through the first and second sides 38 and 40 and through the lever 10. The lever 10 and its associated components pivot on the first shaft 36 through a substantially vertical plane. The first bracket 34 further includes a third side 42 and a fourth side 44 disposed parallel to one another in a substantially horizontal plane. The third and fourth sides 42 and 44 also form upstanding legs of a U shape. The swivel means 32 includes a second U-shaped bracket 46 and second shaft 48. The second bracket 46 has a fifth side 50 and a sixth side 52 disposed parallel to one another in a substantially horizontal plane. The fifth and sixth sides 50 and 52 also form upstanding legs of a U shape. The second shaft 48 is disposed in a substantially vertical plane and passes through the third and fourth sides 42 and 44 of the first bracket 34 and the fifth and sixth sides 50 and 52 of the second bracket. As a result, the first bracket 34, the lever 10 and its associated components swivel on the second shaft 48 through a substantially horizontal plane with respect to the second bracket 46.

Referring to FIGS. 1 and 3-6, the biasing means 13 is a wire spring 54. Referring to FIG. 4, the spring 54 has an elongated portion 56 and two ends. The spring 54 has a hairpin turn 58 at each of its ends and two legs 60 and 62.

Figure 7:
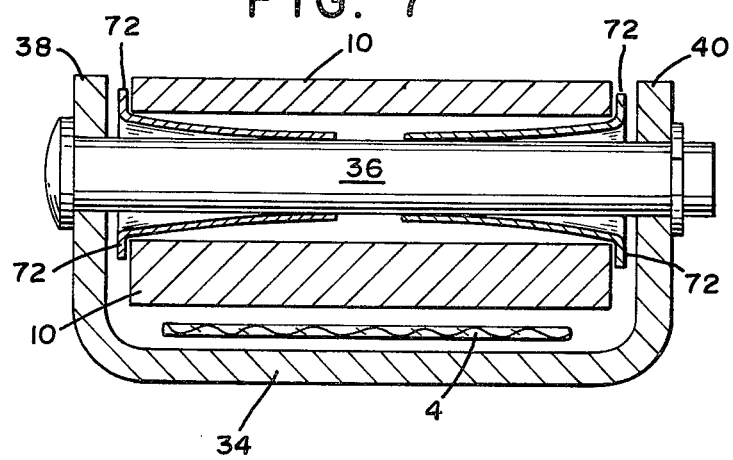
FIG. 7 is a horizontal section along the lines 7—7 in FIG. 1.

Referring to FIG. 7, two resilient bushings 72 are preferably fitted within the lever 10 and around the shaft 36 extending laterally between the first side 38 and the second side 40 of the first bracket 34. The bushings 72 evenly distribute the force applied by the lever 10 laterally across the width of the belt 4 adjacent to surface 18. The bar 12 movable on the crest 16 serves to equalize the force applied by the belt 4 longitudinally along the length of the portion of the belt 4 contacted by the bar 12. The bushings 72 also maintain an approximately constant space between the belt 4 and the bracket 34 and between lever 10 and the belt 4. The bushings 72 also compensate for slight errors in placement of the holes 74 and 76 in the first side 38 and the second side 40 of the first bracket 34 through which the first shaft 36 fits.

In operation, when a force above a predetermined amount is applied in a first direction 6 to the belt 4, it moves the lever 10 from its non-clamping position shown in FIGS. 1 and 3 to its clamping position shown in FIG. 5. Such force above a predetermined amount compresses the legs 60 and 62 of the spring 54 from their position shown in FIG. 4 to their position shown in FIG. 6. The surface 18 of the bar 12 applies a substantially uniform force over an area of contact on a portion of the belt 4 adjacent to the surface 18. Such area contact rather than a line of contact by an edge of the surface 18, or point contact, improves the clamping action on the belt 4. Area contact is obtained by movement of the bar 12 on the creast 16, in conjunction with action of the bushings 72 and in conjunction with pivoting action in two planes on shafts 36 and 48. As a result, the force applied by surface 18 is substantially perpendicular to the plane of the belt 4 adjacent to surface 18. The surface 18 has frictional means, such as knurls, for applying a braking force to the belt 4 to stop movement of the belt 4 through the clamp apparatus 2 in the first unwinding direction 6. A surface 66 on the side of the first bracket 34 facing surface 18 also may have a frictional means, such as knurls, for applying a braking force on the opposite side of the belt 4 to assist in stopping movement of the belt 4 in first unwinding direction 6. In the clamping position of the apparatus 2, shown in FIG. 5, the belt 4 is squeezed between surface 18 and surface 66.

Braking force on the portion of belt 4 between surface 18 and surface 66 is applied by the lever 10 through the crest 16. There are several means for varying the amount of braking force applied to the belt 4. One means is to vary the type of frictional surface on surface 18 and on surface 66. Another means is to vary the leverage applied. The leverage applied is a function of a first distance 68 from the first shaft 36 to the top of the lever 10 where the belt 4 goes around the lever and a second distance 70 from the first shaft 36 to the crest 16. More specifically, the leverage is a function of the ratio of distance 68 to distance 70. Varying the amount of force applied by the lever 10 to the belt 4 between surfaces 18 and 66 may, if desired allow controlled slippage of the belt 4 through the apparatus 2 in an unwinding direction 6.

Referring to FIGS. 8-10, the belt clamp apparatus 2 may be used in an improved safety restraint system 78 for a seated occupant in a vehicle. The restraint system 78 of the present invention includes a shoulder belt means 80 passing over a shoulder of the seated occupant. Typically, the system 78 also includes a lap belt means 82 passing over the lap of the occupant. The belt clamp apparatus 2 is mounted in the vehicle at or above a horizontal plane in the vehicle passing over a shoulder of a seated occupant in the vehicle, such as on a "B-pillar" of the vehicle or on the roof of the vehicle. The belt clamp apparatus 2 of the present invention is responsive to an unwinding force on the belt means 80 above a first predetermined amount, for example, about forty (40) Newtons, resulting from a pull on the shoulder belt means 80 when the seated occupant lurches forward as a result of an emergency condition. The safety restraint system 78 also includes a retractor 84 mounted in the vehicle below the belt clamp apparatus 2 for allowing unwinding of the shoulder belt means 4 in the first direction 6 out of the retractor 84 and for winding the shoulder belt means 80 in the second direction 8 into the retractor 84.

The belt clamp apparatus 2 of the present invention may be used in a variety of ways in the improved safety restraint system 78, such as to provide: a belt sensitive safety restraint system, or a vehicle sensitive safety restraint system, or a dual sensitive safety restraint system, or a force limiting safety restraint system. If a belt sensitive safety restraint system is desired, the retractor 84 may be a simple, inexpensive non-locking retractor. A belt sensitive safety restraint system is a system responsive to force applied on the shoulder belt means 80 in the first direction 6, causing a portion of the belt means 80 to be unwound from the retractor 84. A non-locking retractor allows the shoulder belt means 80 to be freely wound and unwound from the retractor under all conditions. An example of a non-locking retractor is described in U.S. Pat. No. 3,445,078. In such a belt sensitive system having a non-locking retractor, the belt clamp apparatus 2 provides the safety restraint system with belt sensitive capability. The belt clamp apparatus 2 is responsive to an unwinding force on the belt means 80 above the first predetermined amount, for example, about forty (40) Newtons, resulting from a pull on the shoulder belt means 80 when the seated occupant lurches forward as a result of an emergency condition. The belt clamp apparatus 2, in response to such a force above the first predetermined amount, clamps against the belt 4 between surface 18 and surface 16 (FIG. 1), stopping further movement of the belt 4 through the belt clamp apparatus 2 in the first direction 6. Such a non-locking retractor may be simple and inexpensive because it need not have a capacity for withstanding force above the first predetermined amount and because it need not have a locking mechanism, a vehicle sensitive inertial mechanism, or belt sensitive mechanism.

If a vehicle sensitive safety restraint system is desired, the belt clamp apparatus 2 may be used in combination with a vehicle sensitive restractor. A vehicle sensitive safety restraint system is responsive to force applied on the vehicle, such as acceleration, deceleration or change in orientation of the vehicle. The belt clamp apparatus 2 is arranged so that a comparatively high amount of force is required to move the belt clamp apparatus 2 to its clamping position, shown in FIG. 5. This may be arranged, for example, by providing a very strong spring 54. As a result, the vehicle sensitive retractor comes into play during an emergency condition before the belt clamp apparatus 2 can be moved to its clamping position. The vehicle sensitive retractor is responsive to acceleration, deceleration or change in orientation of the vehicle and has a locking mechanism within the retractor which locks the reel of the retractor and prevents further unwinding of the safety belt means 80 from the retractor. Examples of vehicle sensitive retractors are shown in U.S. Pat. Nos. 3,838,831; 3,901,461; 3,913,861; 3,913,862; and 3,940,083.

If a dual sensitive safety restraint system is desired, the belt clamp apparatus 2 may be used in combination with a vehicle sensitive retractor. A dual sensitive safety restraint system is responsive to force applied on the vehicle and is also responsive to force applied on the shoulder belt means 80. The belt clamp apparatus 2 has a comparatively weaker spring 54 than in the vehicle sensitive safety restraint system and provides the restraint system with its belt sensitive capability. The vehicle sensitive retractor provides the safety restraint system 78 with vehicle sensitive capability. Thus, when the occupant lurches forward under emergency conditions and causes a force on the shoulder belt means 80 above the first predetermined amount, for example, about forty (40) Newtons, the belt clamp apparatus 2 clamps against the belt 4 and (FIG. 1) prevents further movement of the belt 4 (FIG. 1) through the belt clamp apparatus 2.

If a force limiting safety restraint system is desired, the safety belt apparatus 2 may be used in conjunction with a belt sensitive retractor. A force limiting safety restraint system is responsive to a force applied on the belt means 80 above a second predetermined amount, for example, about 6000 Newtons, and has a capability for absorbing force above such second predetermined amount, thereby reducing such force above the second predetermined amount to be applied to the occupant. A belt sensitive retractor is a retractor which has a mechanism responsive to acceleration applied on the safety belt means 80. An example of a belt sensitive retractor is described in U.S. Pat. No. 3,741,496. When a force above the first predetermined amount, for example, about 6000 Newtons, is exerted on the shoulder belt means 80, resulting from a pull on the belt means 80 when the occupant lurches forward, the belt clamp apparatus 2 clamps against the belt means 80 and prevents further movement of the belt means 80 through the clamp apparatus until the unwinding force on the belt means 80 reaches a second predetermined amount, for example, about 6000 Newtons, which is greater than the first predetermined value. The belt clamp apparatus 2 has controlled slippage means responsive to unwinding force on the belt means 80 above the second predetermined amount resulting from a pull on the belt means 80 when the occupant lurches forward in response to a force above the second predetermined amount. The belt clamp apparatus 2 allows controlled slippage of the belt means 80 through the belt clamp apparatus 2, thereby absorbing some or all of the force above the second predetermined amount. If the force on the belt means 80 reaches a third predetermined amount, for example, about 7500 Newtons, which is in excess of the second predetermined amount, the belt sensitive mechanism in the retractor comes into play. The belt sensitive mechanism in the retractor locks in response to a force above the third predetermined amount, there by preventing further unwinding of the belt means 80 from the retractor. The third predetermined amount is greater than the second predetermined amount and is also greater than the first predetermined amount. The retractor may be dual sensitive, that is, it may also have a vehicle sensitive mechanism which is responsive to acceleration, deceleration or change in orientation of the vehicle and locks a reel in the retractor to prevent further unwinding of the belt. Examples of dual sensitive retractors are described in U.S. Pat. Nos. 3,858,824 and 3,918,658.

Controlled slippage of the web through the belt clamp apparatus may be achieved by a variety of means. It may be done by changes in design within the belt clamp apparatus, such as the arrangement of the ratio of the first distance 68 to the second distance 70 which varies the leverage of the lever 10 of by varying the frictional braking force applied by clamping surface 18 or surface 66 or both. It may be achieved by changes in an included angle 86 of the belt. The included angle 86 is the angle formed between the shoulder belt means 80 at the top of the clamp apparatus 2 and the shoulder belt means 80 at the bottom of the belt clamp apparatus 2. Preferably, the shoulder belt means 80 at the bottom of the clamp apparatus 2 lies in a substantially vertical plane. If the clamp apparatus 2 is positioned high on the "B-pillar" near the roof as shown in FIGS. 8 and 9, the included angle 86 is smaller than if the clamp apparatus2 is positioned lower on the "B-pillar" closer to the shoulder of the seated occupant as shown in FIG. 10. As the included angle 86 becomes greater, approaching the range of 90°-135°, the belt means 80 has more of a tendency to slip through the clamp apparatus 2. Preferably, the included angle 86 is at or less than about 90°. Controlled slippage may also be achieved by changes in the surface frictional characteristics of the belt composition or by a combination of the foregoing means. The force limiting restraint system is reusable because the energy absorbing function is not accomplished by a breakable member or any other type of one-time operation.

The shoulder belt means 80 may further include an inflatable portion 88 and means for inflating it, such as described in U.S. Pat. Nos. 3,841,654; 3,866,940; 3,897,081; 3,888,503; 3,877,719; 3,970,329; 3,929,348; and 3,820,842.

The retractor 84 may be positioned on the floor of the vehicle, as shown in FIGS. 8 and 10, or on a "B-pillar" of the vehicle, as shown in FIG. 9. The restraint system 78 may include a buckle 90 and a tongue 92 for the buckle 90. The tongue 92 may be arranged so that the belt means 80 and 82 slide through a portion of the tongue 92.

The belt clamp apparatus 2 prevents unwinding of the belt means 80 and 82 resulting from "spool down" and resulting from elongation or stretching of the belt. This is particularly important in restraint systems using a comparatively long length of belt means. "Spool down" occurs when a portion of the belt means 80 already wound around a spool or reel inside the retractor 84 is further tightened around the spool by a force in the first direction 6. Even if rotation of the spool is stopped, tightening of belt convolutions around the spool allows a length of belt to be pulled out of the retractor 84. Such "spool down" or elongation would otherwise reduce the ability of the belt means 80 and 82 to restrain an occupant. When the belt clamp apparatus 2 clamps the belt 4, it prevents force in the belt means 80 or 82 from reaching the retractor 84, thereby preventing "spool down" and elongation between the belt clamp apparatus 2 and the retractor 84. Thus, the belt clamp apparatus 2, and the restraint system in which it is used, reduce forward displacement of the occupant during emergency conditions, such as a vehicle crash, and reduce injuries to the occupant.

This invention also provides a method for absorbing unwinding force resulting from a pull on a safety belt means in an occupant restraint system when an occupant lurches forward against the belt means, which method comprises applying a clamping force to a portion of the belt means for resisting movement of the belt means in an unwinding direction, limiting the clamping force to a predetermined amount and allowing the belt means to be unwound against the clamping force in response to an unwinding force above the predetermined amount. In addition, the invention provides, in a vehicle safety restraint system having a belt means for restraining an occupant when the occupant lurches forward against the belt means under emergency conditions, a method for reducing undesired unwinding of the belt means from a retractor in the restraint system after a locking action has been applied to the belt means within the retractor and reducing undesired elongation of the belt means between the retractor and the occupant, comprising applying a clamping force to a portion of the safety belt means between the retractor and the occupant for resisting movement of the safety belt means in an unwinding direction from the retractor.

We claim:

1. A safety restraint system for a seated occupant in a vehicle, said system having a safety belt means passing over a shoulder of said seated occupant, said system comprising:

a belt clamp apparatus wherein said safety belt means movable through said clamp apparatus in a first direction and in an opposite second direction, said clamp apparatus resisting movement of said belt in said first direction when a force above a first predetermined amount is applied to said belt in said first direction, said clamp apparatus including a lever pivotable on a first shaft, said lever having a clamping position and a non-clamping position, and a first biasing means biasing said lever to its non-clamping position, a clamp bar having a first surface for contacting a portion of said belt, a mounting means on said lever for movably mounting said bar on said lever, said mounting means comprising a channel in said lever, means for retaining said bar in said mounting means of said lever, said retaining means comprising lip means associated with said channel, said clamp bar being freely movable within said channel, and pivot means on a second surface of said clamp bar opposite from said first surface, said clamp bar being movable on said pivot means with respect to said lever for applying a substantially uniform force over an area of contact of said belt; and a retractor mounted in said vehicle below said belt clamp apparatus for allowing unwinding of said safety means in a first direction out of said retractor and for winding said belt means in a second opposite direction into said retractor.

2. The safety restraint system of claim 1 wherein said belt means further comprises an inflatable portion and means for inflating said inflatable portion.

3. The safety restraint system according to claim 1 wherein said retractor is a non-locking retractor allowing said safety belt means to be freely wound and unwound from said retractor under all conditions, said belt clamp apparatus responsive to an unwinding force on said belt means in said first direction above a first predetermined amount resulting from a pull on said belt means as a result of an emergency condition.

4. The safety restraint system according to claim 1 wherein said retractor comprises vehicle sensitive means for sensing acceleration, deceleration or change in orientation of said vehicle.

5. The safety restraint system according to claim 1 wherein said belt clamp apparatus comprises controlled slippage means for allowing movement of said belt means through said belt clamp apparatus in said first direction out of said retractor in response to an unwinding force on said belt means above a second predetermined amount, said second predetermined amount being greater than said first predetermined amount.

6. The safety restraint system according to claim 5 wherein said retractor comprises belt sensitive means responsive to an unwinding acceleration on said belt means above a third predetermined amount and locking means for preventing further unwinding of said belt means from said retractor when said unwinding force is above said third predetermined amount, said third predetermined amount being greater than said first predetermined amount and being greater than said second predetermined amount.

7. The safety restraint system according to claim 6 wherein said retractor further comprises vehicle sensitive means responsive to acceleration, deceleration or change in orientation of said vehicle and locking means for preventing further unwinding of said belt means from said retractor when said acceleration, deceleration or change in orientation is above a predetermined amount.

8. A force limiting safety restraint system for a seated occupant in a vehicle, said system having a safety belt passing over a shoulder of said occupant, said system comprising:

a belt clamp apparatus wherein said safety belt is movable through said clamp apparatus in a first direction and in an opposite second direction, said clamp apparatus resisting movement of said belt in said first direction when a force above a first predetermined amount is applied to said belt in said first direction, said clamp apparatus including a lever pivotable on a first shaft, said lever having a clamping position and a non-clamping position, and a first biasing means biasing said lever to its non-clamping position, a clamp bar having a first surface for contacting a portion of said belt, a mounting means on said lever for movably mounting said bar on said lever, said mounting means comprising a channel in said lever, means for retaining said bar in said mounting means of said lever, said retaining means comprising lip means associated with said channel, said clamp bar being freely movable within said channel, and pivot means on a second surface of said clamp bar opposite from said first surface, said clamp bar being movable on said pivot means with respect to said lever for applying a substantially uniform force over an area of contact of said belt; and said belt clamp apparatus having controlled slippage means responsive to an unwinding force on said belt above a second predetermined amount resulting from a pull on said belt, said second predetermined amount being greater than said first predetermined amount, said controlled slippage means in response to said second predetermined amount of force allowing controlled slippage of said belt through said belt clamp apparatus; and a retractor mounted in said vehicle below said belt clamp apparatus, said retractor having belt-sensitive means responsive to movement of said belt in an unwinding direction above a third predetermined value resulting from a pull on said belt and preventing further unwinding of said belt means from said retractor, said third predetermined value being greater than said second predetermined value.

9. The apparatus according to claim 8 wherein said controlled slippage means comprises a ratio of a first distance to a second distance, said first distance being from said first shaft to a top of said lever, said second distance being from the first shaft to said pivoting means of said bar.

10. The apparatus according to claim 8 wherein said controlled slippage means comprises the strength characteristics of said first biasing means.

11. The apparatus according to claim 8 wherein said controlled slippage means comprises the surface characteristics of the belt.

12. The apparatus according to claim 8 wherein said controlled slippage means comprises an included angle between the belt at the top of said lever and the belt at the bottom of said lever.

13. In a belt clamp apparatus wherein a safety belt is movable through said clamp apparatus in a first direction and in an opposite second direction, said clamp apparatus resisting movement of said belt in said first direction when a force above a first predetermined amount is applied to said belt in said first direction, said clamp apparatus including a lever pivotable on a first shaft, said lever having a clamping position and a non-clamping position, and a first biasing means biasing said lever to its non-clamping position, the improvement comprising:

a clamp bar having a first surface for contacting a portion of said belt;

a mounting means on said lever for movably mounting said bar on said lever, said mounting means comprising a channel in said lever;

means for retaining said bar in said mounting means of said lever, said retaining means comprising lip means associated with said channel, said clamp bar being freely movable within said channel; and pivot means on a second surface of said clamp bar opposite from said first surface, said clamp bar being movable on said pivot means with respect to said lever for applying a substantially uniform force oveer an area of contact of said belt.

14. The apparatus according to claim 13 and further comprising means for mounting said apparatus to a vehicle, said mounting means comprising a pivot means for moving a portion of said apparatus in a substantially vertical plane, said pivot means including said first shaft.

15. The apparatus according to claim 14 wherein said pivot means comprises: a first U-shaped bracket having a first side and a second side disposed parallel to one another in a substantially vertical plane, said lever disposed between said first and second sides, and said first shaft passing through said first and second sides and said lever.

16. The apparatus according to claim 15 wherein: said first bracket further comprises a third side and a fourth side disposed parallel to one another in a substantially horizontal plane; and said swivel means comprises:
   a second U shaped bracket having a fifth side and a sixth side disposed parallel to one another in a substantially horizontal plane; and
   a second shaft disposed in a substantially vertical plane and passing through said third and fourth sides of said first bracket and said fifth and sixth sides of said second bracket, whereby said first bracket swivels on said second shaft through a substantially horizontal plane with respect to said second bracket.

17. The apparatus according to claim 11 and further comprising a second surface on said first bracket, said second surface opposite from said first surface on said bar, said belt passing between said first surface and said second surface, said second surface having a frictional means.

18. The apparatus according to claim 17 wherein said frictional means on said second surface are knurls.

19. The apparatus according to claim 13 and further comprising a controlled slippage means responsive to force above a second predetermined amount greater than said first predetermined amount for allowing slippage of said belt in said first unwinding direction.

20. The apparatus according to claim 13 wherein said pivot means comprises a crest surface.

21. The apparatus according to claim 20 wherein said crest surface extends across the width of said bar.

22. The apparatus according to claim 21 wherein said lip means comprises a first lip on one side of said channel and a second lip on a second side of said channel.

23. The apparatus according to claim 22 and further comprising a second biasing means disposed in said channel and biasing said clamp bar away from said belt.

24. The apparatus according to claim 23 wherein said clamp bar is disposed adjacent to one end of said lever.

25. The apparatus according to claim 13 including means for even distributing said force laterally across the width of said belt.

26. The apparatus according to claim 25 wherein said means for distributing said force laterally across the width of said belt comprises resilient bushing means disposed around said first shaft.

27. In a belt clamp apparatus wherein a safety belt is movable through said clamp apparatus in a first direction and in an opposite second direction, said clamp apparatus resisting movement of said belt in said first direction when a force above a first predetermined amount is applied to said belt in said first direction, said clamp apparatus including a lever pivotable on a first shaft, said lever having a clamping position and a non-clamping position, and a first biasing means biasing said lever to its non-clamping position, the improvement comprising:
   a clamp bar having a first surface for contacting a portion of said belt;
   a mounting means on said lever for movably mounting said bar on said lever;
   means for retaining said bar in said mounting means of said lever;
   said mounting means comprising a channel in said lever and said means for retaining said bar in said mounting means comprising a first lip on a first side of said channel and a second lip on a second side of said channel; and
   a crest on a second surface of said clamp bar opposite from said first surface, said clamp bar movable on said crest with respect to said lever for applying a substantially uniform force over an area of contact on said belt.

28. The apparatus according to claim 27 and further comprising a swivel means for moving a portion of said apparatus in a substantially horizontal plane.

29. The apparatus according to claim 27 wherein: said biasing means is a spring, said spring having an elongated portion, two ends, and a hairpin turn at each end.

30. The apparatus according to claim 27 wherein said first surface has a frictional means for applying a braking force on a portion of said belt.

31. The apparatus according to claim 30 wherein said frictional means are knurls on said first surface.

32. The apparatus according to claim 27 and further comprising a recess in said bar adjacent to said first lip; and a second biasing means disposed in said recess between said bar and said first lip of said lever.

33. In a belt clamp apparatus for a vehicle occupant restraint system wherein a safety belt is movable through said clamp apparatus in an unwinding direction and in an opposite winding direction, said clamp apparatus resisting movement of said belt in said unwinding direction when a force above a predetermined magnitude is applied to said safety belt in said unwinding direction, said clamp apparatus including a lever pivotable on a first shaft, said lever having a clamping position and non-clamping position, and a biasing means biasing said lever in its non-clamping position, the improvement comprising:
   a resilient bushing means disposed around said first shaft;
   a clamp bar having a first surface for contacting a portion of said belt;
   a mounting means adjacent one end of said lever for movably mounting said bar on said lever, said mounting means comprising a channel in said lever, said bar disposed in said channel, a first lip on a first side of said channel and a second lip on a second side of said channel for retaining said bar is said channel;
   a crest on a second surface of said bar opposite from said first surface, said bar movable on said crest in said channel for applying a substantially uniform force over an area of contact on said belt; and
   a recess in said bar adjacent to said first lip; and a spring disposed in said recess between said bar and said first lip of said lever.

* * * * *

UNITED STATES PATENT AND TRADEMARK OFFICE
CERTIFICATE OF CORRECTION

PATENT NO. : 4,306,735

DATED : December 22, 1981

INVENTOR(S) : R. Pfeiffer et al.

It is certified that error appears in the above-identified patent and that said Letters Patent are hereby corrected as shown below:

Column 8, Line 51, following "means" insert --is--.

Signed and Sealed this

Sixteenth Day of November 1982

[SEAL]

Attest:

Attesting Officer

GERALD J MOSSINGHOFF

Commissioner of Patents and Trademarks